United States Patent [19]

Trask

[11] Patent Number: 4,999,646
[45] Date of Patent: Mar. 12, 1991

[54] METHOD FOR ENHANCING THE UNIFORMITY AND CONSISTENCY OF DOT FORMATION PRODUCED BY COLOR INK JET PRINTING

[75] Inventor: Jeffrey L. Trask, Boise, Id.

[73] Assignee: Hewlett-Packard Company, Palo Alto, Calif.

[21] Appl. No.: 444,082

[22] Filed: Nov. 29, 1989

[51] Int. Cl.$^5$ .............................................. B41J 2/21
[52] U.S. Cl. ................................. 346/11; 346/140 R
[58] Field of Search ................ 346/1.1, 140; 358/298, 358/75

[56] References Cited

U.S. PATENT DOCUMENTS 4,748,453 5/1988 Lin et al. ............................ 346/140

Primary Examiner—Benjamin R. Fuller
Assistant Examiner—Alrick Bobb

[57] ABSTRACT

A multiple pass complementary dot pattern ink jet printing process for enhancing the uniformity and consistency of dot (drop) formation during color ink jet printing. Such enhancement in turn directly affects and improves the total print quality over a color printed area by minimizing the undesirable characteristics of coalescence, beading, hue shift, bending, cockeling and color bleed when printing on both transparencies and plain or special papers. Using this process, successive printed swaths are made by depositing first and second partially overlapping complementary dot patterns on a print media. Simultaneously, the dot spacing in coincident dot rows within the overlapping portions of the dot patterns is alternated between dots in the first pattern and dots in the second pattern. This invention is also directed to the novel process of combining complementary pass ink jet printing as described above with dot-next-to-dot (DND) super pixeling in order to further optimize the ink drop drying conditions desirable for producing the above optimized uniformity and consistency of dot formation over a given color printed area.

8 Claims, 3 Drawing Sheets

METHOD FOR ENHANCING THE UNIFORMITY AND CONSISTENCY OF DOT FORMATION PRODUCED BY COLOR INK JET PRINTING

TECHNICAL FIELD

This invention relates generally to color ink jet printing and more particularly to a process for improving the print quality and uniformity of color printed areas on different types of media which have been printed with color ink jet printers. These improvements in print quality and color uniformity are a direct result of the improvements in uniformity and consistency of dot formation as provided herein.

RELATED INVENTIONS

U.S. patent application Ser. No. 290,543 of Mark S. Hickman entitled "Printing of Pixel Locations By An Ink Jet Printer Using Multiple Nozzles For Each Pixel or Pixel Row" is directed to an ink jet printer used in the formation of images to reduce the visual impact caused by improperly operating nozzles or inoperable nozzles. This approach uses multiple nozzles per pixel location or per pixel row, and this application is assigned to the present assignee and is incorporated herein by reference.

U.S. patent application Ser. No. (PD 189255) of Alpha Doan entitled "Interlace Printing Process" is directed to improving the quality of ink jet printed images by overlapping the ink dots which are printed on successive passes of a printhead. This approach further uses a grouping of printed pixels into super pixels, and is also assigned to the present assignee and incorporated herein by reference.

U.S. Pat. No. 4,855,752 to Donald B. Bergstedt and entitled "Method of Improving Dot-On-Dot Graphics Area-Fill Using An Ink Jet Device" discloses a method of ink jet printing where successive swath overlapping is used for printing different colors over wide areas in order to reduce banding which is produced by hue shift on the print medium. This process uses dot-on-dot printing on special papers and is not particularly suited for printing with largely water based inks and using large drop volumes. U.S. Pat. No. 4,855,752 is also assigned to the present assignee and is incorporated herein by reference.

U.S. Pat. No. 4,930,018, issued May 29, 1990 of C. S. Chan et al entitled "Method and System For Enhancing The Quality of Both Color and Black and White Images Produced By Ink Jet Printers" is directed to a high resolution color printing process which provides for the distribution of ink on a printed medium in such a manner as to minimize paper cockeling. This approach also uses super pixeling in order to optimize the distribution of ink and maximize the resolution of the printed image. This application is also assigned to the present assignee and is incorporated herein by reference.

BACKGROUND ART

Substantial advances have been made in recent years in the field of color ink jet printing, and many of these advances relate to improving the print quality of the printed media, which include plain paper, special papers and various types of transparencies. Typical of these advancements in this art and technology are the various improvements embodied in the Hewlett Packard "PAINTJET" printer and described in some detail in the *Hewlett Packard Journal*, Volume 39, No. 4, August 1988, incorporated herein by reference.

In this field of color ink jet printing, various approaches have been used to control the overall pattern, size and spacing of individual ink drops ejected from an ink jet printer (hereinafter "dots") and printed within a given surface area of media in order to control the print quality of the printed media. This control is desirable to insure that the drops printed on one "pass" or traverse of an ink jet printhead relative to adjacent print media have an adequate time to dry before another overlying pass is made within that same printed area.

Inadequate drying time of these printed dots will produce a number of undesirable characteristics in resultant print quality, depending upon the type of print media used. For example, in the field of color ink jet printing on transparencies where ink colors such as cyan, yellow, and magenta have been printed over a given area in dot-on-dot (DOD) fashion, excessive volumes of ink per unit area on these transparencies will cause the ink to bead up, coalesce and sometimes produce banding as a result of an over-saturation of ink on some areas of the printed media.

It is also desirable that dots of different passes and within a given pass dry uniformly and consistently in addition to having adequate time to dry. Non-uniform or inconsistent drying will also produce a number of undesirable print quality effects depending upon the media used. Inadequate drying time is one possible cause of non-uniform drying of the ink, but there are also other causes which are discussed below.

In an effort to avoid the above problems of beading, coalescence and over-saturation using dot-on-dot (DOD) printing, some color ink jet printers have used dot-next-to-dot (DND) printing processes wherein successively printed dots are ejected onto side by side pixels in a given printed area. These pixels may, for example, form quadrants or other sections of a larger or super pixel as is known in the art, and color mixing takes place at the side by side or DND interface boundaries within the super pixel. This DND approach to color ink jet printing is preferable to DOD printing processes where either large ink drop volumes or largely water based inks, or both, are used in printing on plain paper.

One approach to solving some of the above problems with printing on transparencies is disclosed in U.S. Pat. No. 4,748,453 issued to Lin et al and incorporated herein by reference. In this patent, there is disclosed one type of complementary multiple-pass DOD ink jet printing process which was developed to avoid some of the above problems related to beading on transparencies. The Lin et al process of U.S. Pat. No. 4,748,453 successive multiple passes of an ink jet pen relative to the print media in a DOD process wherein a first ink swath is completed by the use of two successive ink passes having complementary dot patterns therein. Thereafter, a second swath is laid down immediately adjacent to the first swath and also by the use of two or more successive ink jet passes having corresponding complementary dot patterns therein.

Whereas the above described Lin et al process has to some extent minimized the problems of hue shift and beading on certain types of transparencies, this process can nevertheless still be characterized by the problem of "banding" at the boundaries between adjacent print swaths. This type of banding occurs frequently when largely water based inks are used on plain paper with accelerated drying. The characteristic of banding is one evidenced by repeated variations in the optical density, hue, reflectance, or anything else which visibly delineates the individual swaths or dot rows which make up a printed area. Banding is most visible in printed areas of solid color where it often appears as a narrow white or dark (over-saturated) line within a printed area. Banding can be caused by a number of things that effect dye placement, such as ink concentration, penetration, reaction on, into or with the print media or within the ink itself. Banding can also be caused by variations in ink surface tension which lead to beading, puddling and coalescence of the ink. These latter characteristics in turn can produce variations in ink drying times and non-uniform drying, and these variations can cause banding.

This characteristic of banding is particularly noticeable if the Lin et al process of U.S. Pat. No. 4,748,453 is used on paper instead of transparencies. For example, using the complementary multiple pass process of Lin et al, there are two different kinds of banding which can occur on plain paper depending on the properties of the ink used. A wettable (low surface tension) ink will rapidly cover the printed area, and in this case, drying is most rapid at the edges of the swath where the dye is concentrated after drying as a result of the edge evaporating water. A non-wettable (high surface tension) ink will tend to bead up in the middle of the printed area, thus causing the edges of the printed area to be of a lighter color than in the middle of the printed area where dye is concentrated in puddles or beaded areas. Thus, either a light band or dark band is possible depending on the ink additives used, and both types of banding are produced by non-uniform drying.

In addition to the above, the Lin et al process also exhibits the characteristic of beading on transparencies if the dots per inch or dot size per se exceeds a given threshold, or if the ink used has a low degree or speed of absorption into the transparent media coating. Thus, the Lin et al process of U.S. Pat. No. 4,748,453 is primarily directed to solving print quality problems associated with transparencies where it has met with limited success. The Lin et al process meets with still other more exaggerated problems such as banding when it is applied to either plain or special papers or when the ink formulation used is largely water based. In addition, the Lin et al process does not utilize super pixeling printing in order to minimize the above problems of banding.

Nozzle direction errors and ink drop volume variations as well as paper motion errors, carriage motion errors and paper shrinkage can also produce banding. In the normal mode of operation, weak nozzles in a printhead or missing nozzles therein can produce banding; and the concentration or lack of dye at the interface boundary between successive scans or swaths can also produce banding as previously indicated.

DISCLOSURE OF INVENTION

The general purpose of this invention is to provide a new and improved dot-next-to-dot (DND) process for controlling the ink distribution over a given printed area of print media during multi-color ink jet printing in such a manner that enhances print quality on all types of printed media. In addition, this process minimizes banding on such media which is caused for all of the aforestated reasons. This control not only minimizes the undesirable characteristics of coalescence, beading, hue shift and banding when printing on transparencies, but it also minimizes these characteristics, as well as paper cockeling and color bleed, when printing on plain or special papers.

This purpose is accomplished by depositing a first pattern of dots consisting of a predetermined number of dot rows over a preselected surface area of print media, and then depositing a second pattern of dots also consisting of a predetermined number of dot rows complementary in spacing with the first pattern of dots. The second pattern of dots overlaps the first pattern of dots only by a predetermined percentage of surface area of the first pattern which is less than 100 percent. Thus, this process is alternatively referred to herein as a "shingling" process which is in reference to the partial overlap of shingles on a roof. This percentage of overlap may vary depending upon a particular use combination of ink, print media, print density, print speed, and the like and will typically be about fifty (50) percent of overlap. This DND process further includes alternating the adjacent spacing of dots in coincident rows of dots in the first and second patterns of dots within overlapping areas of the patterns. This alternation minimizes dot variability and overall pattern variability and the visual effects thereof which may occur as a result of the variation in performance in the orifii used to print both the first and second patterns.

Thus, the novel process combination herein of alternating the adjacent spacing of dots in coincident dot rows when done simultaneously with overlapping the above first and second dot patterns by a predetermined overlap percentage which is less than 100 percent serves to enhance the print quality of the printed media. It does so by minimizing the characteristics of beading, hue shift, banding, coalescence, paper cockeling, and color bleed produced by ink printed on either transparencies or plain or special papers.

This invention is also directed to the novel process combination of:

1. providing complementary and overlying swath patterns of ink jet print, and
2. utilizing super pixeling in the overlying printed areas to generate dot-next-to-dot (DND) printed images. This process combination serves to enhance the uniformity and consistency of dot formation over the ink jet printed image.

The above advantages, operation and purpose of this invention will become better understood with reference to the following description of the accompanying drawing.

BRIEF DESCRIPTION OF THE DRAWINGS

Referring now to FIG. 1, a first dot pattern 10 includes sixteen (16) dot rows 12 with the encircled numbers 1 through 16 to indicate the relative dot placement for the dots in each row. The odd and even numbered rows are spaced in complementary positions as shown, and this complementary dot spacing per se is known in the art and provides a fifty percent area fill on the first printed pass. This complementary spacing is desirable in order to properly allow for the ink to undergo a certain amount of drying before starting a second pass, and also to allow the ink to dry uniformly.

As shown in FIG. 2, the second pass consisting of a second dot pattern 14 is made over only fifty percent of the width dimension of the first pass and is complementary in dot spacing with respect to the first dot pattern. In addition, each dot printed in each dot row of the fifty percent overlapping areas of the first and second dot patterns alternates in horizontal spacing between dots in the first and second patterns, respectively. That is, every other dot printed in the overlapping rows is printed with a different printhead nozzle, and this feature minimizes dot variability and banding as previously indicated.

Figure 1:
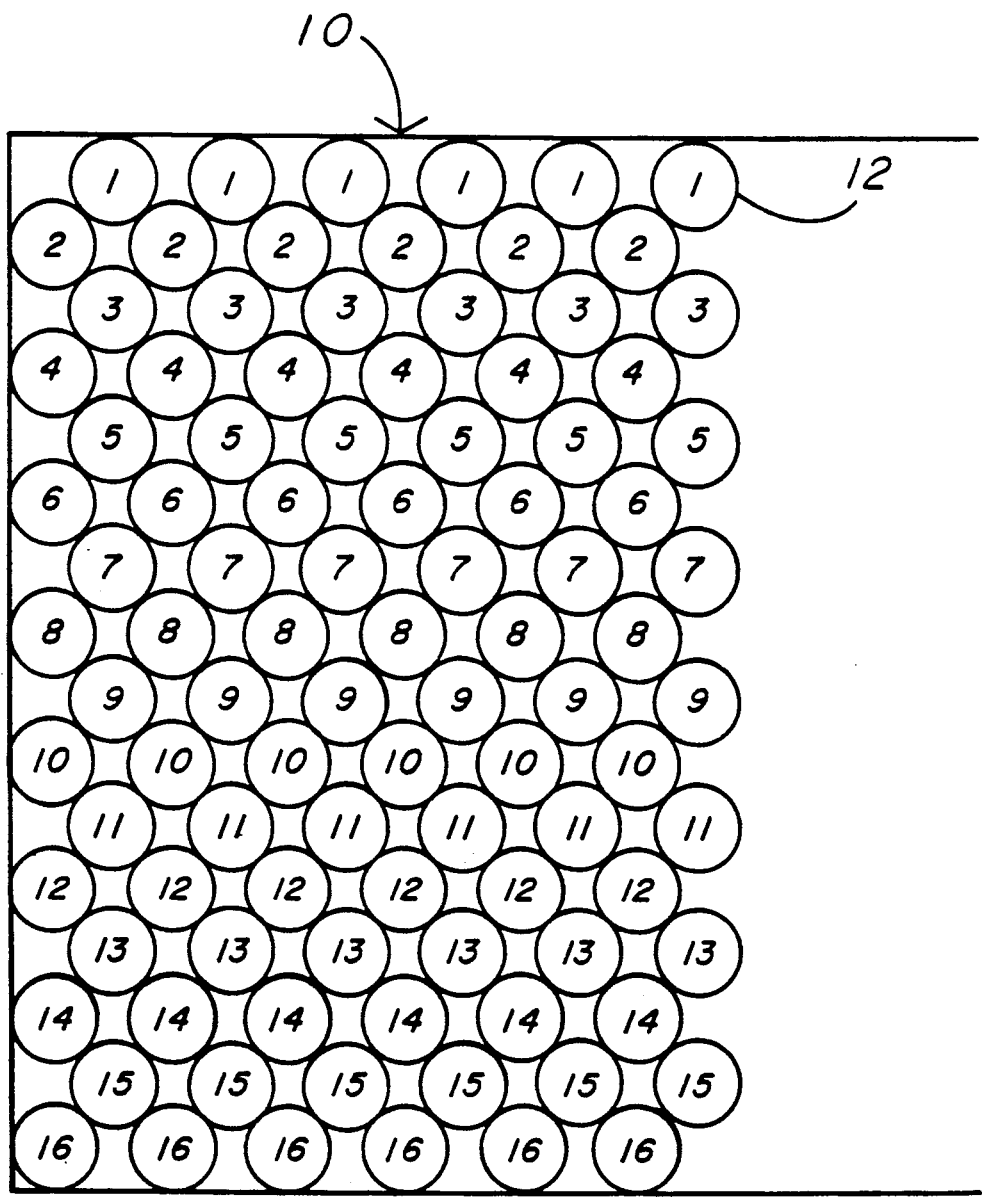
FIG. 1 is a schematic representation in plan view of the dot placement of ink printed by an ink jet printer when printing a first dot pattern on a given area of print media.
Figure 2:
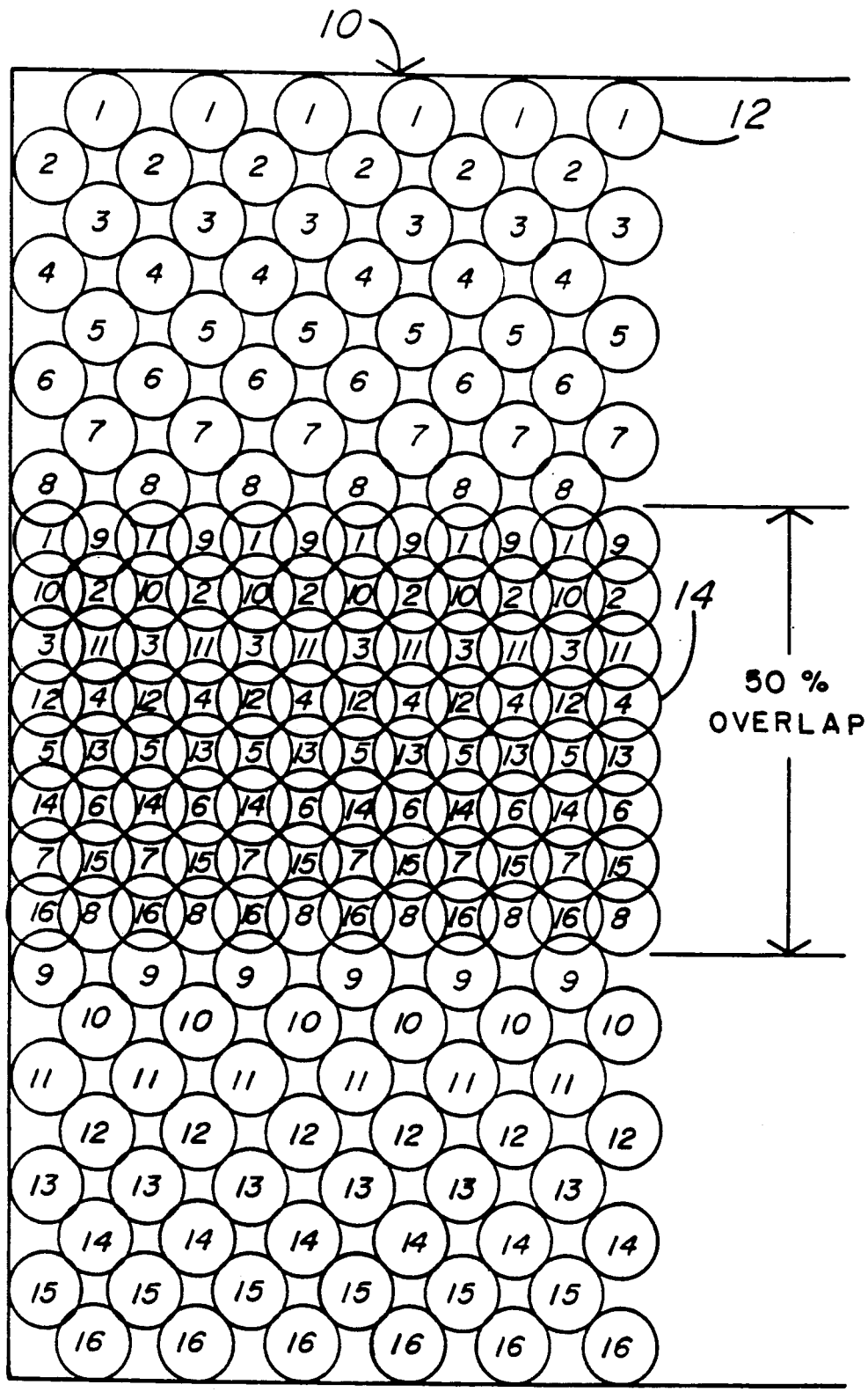
FIG. 2 is a schematic representation in plan view of the complementary dot placement of a second dot pattern printed over fifty (50) percent of the pattern width of the first dot pattern.

Thus, it is the novel combination of this partial dot pattern overlap taken with the alternating of dots horizontally in the overlapping dot rows in FIG. 2 that enhances the overall print quality of the printed media and minimizes the above described undesirable visible characteristics such as banding.

There are three ways in which the "shingling" or partial dot-pattern-overlap process described above alleviates print quality problems:
1. The fifty percent checkerboard (or other suitable overlap pattern) is chosen to minimize interactions between individual d-ops while they are drying. These interactions include phenomena such as beading and dye migration or ink concentration at the edge of a swath. The above checkerboard like pattern also eliminates a single continuous horizontal line along which ink is forced to dry, and this tends to eliminate banding.
2. The fifty percent dot pattern overlap of the two swaths as described herein breaks up the horizontal drying patterns and minimizes banding.
3. The use of alternating nozzles in the overlapping dot rows minimizes the impact of nozzle variations.

Figure 3A:
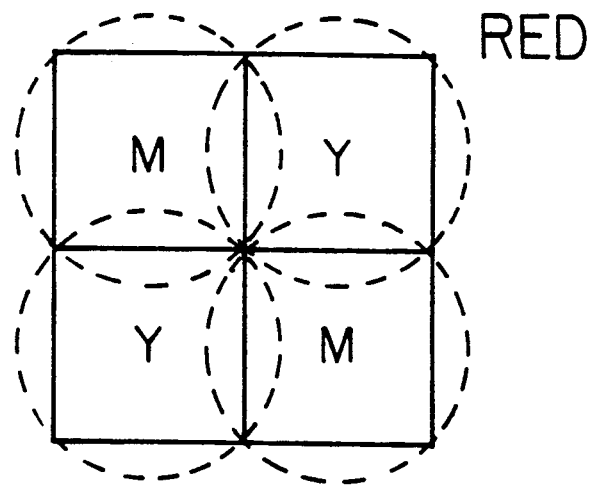
FIGS. 3A; 3B, and 3C are two by two super pixels in which dot-next-to-dot printing is used to create the colors of red, green, and blue from the primary colors of magenta, yellow, and cyan.
Figure 3B:
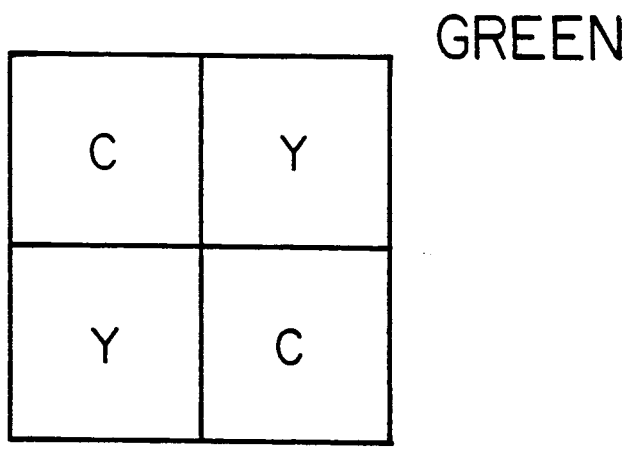
Figure 3C:
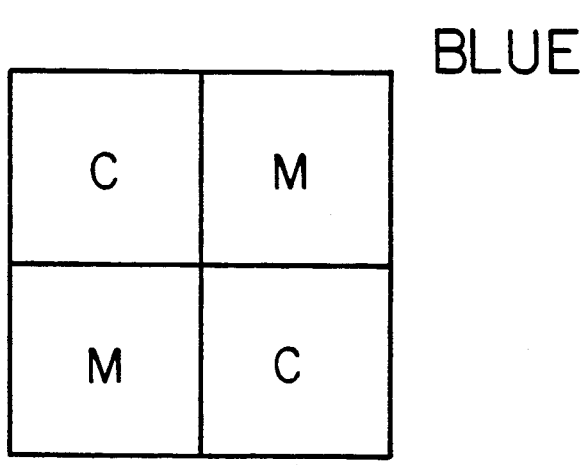

Referring now to FIGS. 3A, 3B, and 3C, each of these two-by-two (2×2) super pixels defines a segment area of dot overlap in FIG. 2 above containing four adjacent dots which have been deposited in dot-next-to-dot (DND) fashion. This DND approach of the present invention distinguishes it from the dot-on-dot (DOD) or dot-on-dot-always (DDA) approaches employed in the above identified Hickman and Doan applications assigned to the present assignee. It was possible to use dot-on-dot (DOD) printing in the above Hickman and Doan processes because, among other reasons, these processes employed print drop volumes in the range of 60-80 picoliters (pL). Using ink drop volumes in this range, it is possible to operate with certain types of print media and their associated absorption rates and still provide acceptable ink drying times and uniformity and consistency of dot formation. The DDA approach is one in which every pixel always has two small drops applied to it in order to alleviate the problem created when larger drops printed in conventional DOD fashion could not be properly absorbed (e.g. at high dot-per-inch (DPI) resolutions) by a single pixel location in certain materials without excessive cockeling.

However, in accordance with the present invention where it is desired to be able to operate satisfactorily with increased drop volumes in the range of 120-140 pL and/or with largely water based inks on plain paper, the DND approach described and claimed herein is desirable in novel combination with the above "shingling" or overlap printing approach to even further maximize the uniformity and consistency of drop formation and the resultant uniformity and print quality of printed color images formed by same. One of the reasons for operating with this increased ink drop volume is to be able to convert existing large drop volume black and white pens to color.

Referring now to FIG. 3A, the color red (R) results from a DND mixture of the colors of magenta and yellow, whereas in FIG. 3B the color green (G) is produced by mixing the colors cyan and yellow. In FIG. 3C, cyan and magenta are mixed in the four quadrants of the two by two super pixel shown to produce the color blue (B) as indicated.

Thus, it will be appreciated by those skilled in the art that the following constituents of the novel process combination described herein include:
1. complementary swath passes,
2. shingling,
3. dot row alternation, and
4. dot-next-to-dot (DND) printing. These are the features which make up the novel process combination described herein and together serve to maximize both the uniformity and consistency of dot formation during color ink jet printing and also serve to enable each drop or dot deposited to dry on the underlying print media under a minimum influence of the wetting characteristics of adjacently deposited dots.

Finally, it should be understood and appreciated that the DND shingling process described and claimed herein is but one of several processes which must be carefully controlled in order to maximize the print quality output of color ink jet printers. Such print quality can be affected by many other parameters such as: a. consistency of ink drop volume of the deposited dots or drops, b. the uniformity of the drying temperature across the printed media and produced by adjacent heating elements, and c. variations in media texture and ink composition used.

Thus, these other variable parameters and process considerations are not treated in this application, but are discussed in several available textbook references such as *Printing Fundamentals* by Alex Glassman, Tappi Press, Copyright 1985, incorporated herein by reference. They are also described in various sections of the above-identified *Hewlett Packard Journal* article and particularly at page 45 thereof.

Various modifications may be made in and to the above described embodiments without departing from the scope of this invention. For example, the percentage of successive swath dot patterns overlap may be varied from fifty percent (50%) to lesser or greater amounts of overlap depending upon the type of print media and inks used and also considering the print speeds and type of media drying system used. Also, other super pixel sub-divisions such as three by three (3×3) subdivisions may be desirable for certain types of color printing applications.

Finally, the use of the doctrine of incorporation-by-reference herein is not intended as a basis or supplement for the inventor's duty to disclose the best mode for carrying out this invention as required by 35 U.S.C. 112. Based upon a current understanding of present state-of-the-art developments, it is believed that this duty has been fully met without any use of the doctrine of incorporation-by-reference. Some of the processes and devices disclosed in both the patents and patent applications referenced herein may not be directly useful in the manufacture of the inventive subject matter disclosed and claimed herein. However, the above references to these patents and pending applications, some of which are assigned to the present assignee, are intended to: (a) provide an enhanced substance to the overall teaching quality of this document, and (b) provide a basis upon which further improvements may be made in the rapidly growing technical field of ink jet printing.

I claim:

1. An ink jet printing process for enhancing the uniformity and consistency of dot formation during color ink jet printing, comprises the steps of:
    a. depositing a first pattern of dots consisting of a predetermined number of dot rows such as dot rows one through sixteen herein which define a first swath or pass width over a preselected surface area of print media, and
    b. depositing a second pattern of dots also consisting of a predetermined number of dot rows such as dot rows one through sixteen herein which define a second swath or pass width and which is complementary in spacing with said first pattern, and
    c. overlapping only a predetermined fraction of dot rows within said first swath or pass width with a predetermined fraction of dot rows within said second swath or pass width.

2. The process defined in claim 1 which further includes alternating the adjacent spacing of dots in coincident rows of dots within overlapping areas of said first and second patterns, thereby minimizing dot variability as a result of variation in performance in the orifii used to create either the first or second pattern.

3. An ink jet printing process for enhancing the uniformity and consistency of dot formation during color ink jet printing, comprising the steps of:
    a. depositing a first pattern of dots consisting of a predetermined number of dot rows over a preselected surface area of print media,
    b. depositing a second pattern of dots complementary in spacing with said first pattern to form only a partial overlapping of said first and second patterns so that the swath or pass width of dot rows defining said first pattern overlaps only a fraction of the dot rows defining said second pattern, and
    c. printing groups of dots in the overlapping areas of said first and second patterns in adjacent pixels which combine to form a larger super pixel wherein dot-next-to-dot (DND) color mixing is achieved.

4. The process defined in claim 3 which further includes alternating the adjacent spacing of dots in coincident rows of dots in said first and second dot patterns within overlapping areas of said patterns, thereby minimizing dot variability as a result of variations in performance in the orifii, used for producing either the first or second dot patterns.

5. The process defined in claim 3 wherein said super pixels each have sub-divided sections of smaller pixels which are adapted to receive the primary ink colors of cyan, magenta, yellow, and black.

6. The process defined in claim 3 which further includes depositing said second pattern of dots to overlap only a predetermined percentage of surface area of said first pattern of dots which is less than 100 percent.

7. The process defined in claim 4 which further includes depositing said second pattern of dots to overlap only a predetermined percentage of surface area of said first pattern of dots which is less than 100 percent.

8. The process defined in claim 7 wherein said super pixels each have sub-divided sections of smaller pixels which are adapted to receive the primary ink colors of cyan, magenta, yellow, and black.

* * * * *

Disclaimer 4,999,646—Jeffrey L. Trask, Boise, Id. METHOD FOR ENHANCING THE UNIFORMITY AND CONSISTENCY OF DOT FORMATION PRODUCED BY COLOR INK JET PRINTING. Patent dated March 12, 1991. Disclaimer filed July 23, 1998, by the assignee, Hewlett-Packard Company.

Hereby enters this disclaimer to claims 1 and 2 of said patent.

*(Official Gazette,* October 20, 1998)